United States Patent
Nielsen

(10) Patent No.: US 12,089,617 B2
(45) Date of Patent: Sep. 17, 2024

(54) IMITATION SKINLESS SAUSAGES

(71) Applicant: DUPONT NUTRITION USA, INC., Wilmington, DE (US)

(72) Inventor: Helge Henrik Nielsen, Helsinge (DK)

(73) Assignee: International N&H USA, Inc., Wilmington, DE (US)

( * ) Notice: Subject to any disclaimer, the term of this patent is extended or adjusted under 35 U.S.C. 154(b) by 311 days.

(21) Appl. No.: 15/564,757

(22) PCT Filed: Apr. 8, 2016

(86) PCT No.: PCT/US2016/026636
§ 371 (c)(1),
(2) Date: Oct. 6, 2017

(87) PCT Pub. No.: WO2016/164721
PCT Pub. Date: Oct. 13, 2016

(65) Prior Publication Data
US 2018/0103664 A1    Apr. 19, 2018

Related U.S. Application Data

(60) Provisional application No. 62/145,673, filed on Apr. 10, 2015.

(51) Int. Cl.
| | | |
|---|---|---|
| *A23L 13/60* | (2016.01) | |
| *A22C 11/00* | (2006.01) | |
| *A22C 13/00* | (2006.01) | |
| *A23J 3/14* | (2006.01) | |
| *A23J 3/26* | (2006.01) | |
| *A23L 13/50* | (2016.01) | |
| *A23L 29/256* | (2016.01) | |
| *A23P 30/25* | (2016.01) | |

(52) U.S. Cl.
CPC ............ *A23L 13/65* (2016.08); *A22C 11/001* (2013.01); *A22C 13/0013* (2013.01); *A23J 3/14* (2013.01); *A23J 3/26* (2013.01); *A23L 13/52* (2016.08); *A23L 29/256* (2016.08); *A23P 30/25* (2016.08); *A22C 2013/0023* (2013.01); *A23V 2002/00* (2013.01)

(58) Field of Classification Search
CPC ........... A23L 13/52; A23L 13/60; A23L 13/65
See application file for complete search history.

(56) References Cited

U.S. PATENT DOCUMENTS

| | | | |
|---|---|---|---|
| 4,156,027 A | 5/1979 | Deppner, Jr. | |
| 6,183,826 B1 | 2/2001 | Quinones et al. | |
| 8,980,348 B2 * | 3/2015 | Baron | A23C 9/156 |
| | | | 239/33 |
| 8,980,349 B2 | 3/2015 | Nielsen et al. | |
| 2005/0064118 A1 | 3/2005 | Damstetter | |
| 2005/0226968 A1 | 10/2005 | Holzschuh et al. | |
| 2007/0218173 A1 | 9/2007 | Shulman et al. | |
| 2011/0117254 A1* | 5/2011 | Van De Nieuwelaar | |
| | | | A22C 11/00 |
| | | | 426/277 |
| 2012/0263842 A1 | 10/2012 | Tanguy | |

FOREIGN PATENT DOCUMENTS

| | | | |
|---|---|---|---|
| CN | 101461544 A | 6/2009 | |
| EP | 784235 A | 10/1957 | |
| GB | 784235 A | * 10/1957 | |
| JP | S47-026444 A | 10/1972 | |
| JP | 2006296319 A | 11/2006 | |
| WO | 0215715 A1 | 2/2002 | |
| WO | 2009145626 A1 | 12/2009 | |
| WO | 2009155511 A2 | 12/2009 | |
| WO | 2014007630 A2 | 9/2014 | |

OTHER PUBLICATIONS

Blandino et al; Formation of Calcium Alginate Gel Capsules: Influence of Sodium Alginate and CaCl2 Concentration on Gelation Kinetics Journal of Bioscience and Bioencineering vol. 88, No. 6, 686-689. 1999 (Year: 1999).*

Schuster et al; Microstructural, mechanical and mass transport properties of isotropic and capillary alginate gels This journal is © The Royal Society of Chemistry 2014 Soft Matter, 2014, 10, 357 (Year: 2014).*

* cited by examiner

*Primary Examiner* — Vera Stulii

(57) ABSTRACT

A fine emulsion sausage having an alginate coating having a thickness of 0.05 mm or less; said sausage substantially possessing the visible and organoleptic properties of a skinless sausage. Also, a method of manufacturing such sausages, which method comprises co-extruding a fine emulsion filling with a casing paste comprising alginate to form a coextruded product comprising 1.5% or less by weight of casing paste, based upon the total weight of the casing paste and filling; and contacting such coextruded product with a solution containing calcium ions, which solution has a pH below the pKa value of the alginate.

23 Claims, No Drawings

IMITATION SKINLESS SAUSAGES

FIELD OF THE INVENTION

The present invention is directed to a fine emulsion sausage having an alginate casing. In another aspect, the present invention is directed to a method of manufacturing such sausage.

BACKGROUND OF THE INVENTION

Many kinds of sausages, particularly hot dogs (also commonly referred to as frankfurters or wieners), are consumed as skinless—i.e., without a coating. These sausages are prepared by stuffing the filling into a cellulose casing; cooking the encased sausages; cooling; and removing the casing prior to packaging. The process steps involved in first stuffing and then removing such cellulose casings add considerable cost to the manufacture of such skinless sausages. Accordingly, it is desirable to possess a process for manufacturing hot dogs and other fine emulsion sausages, which does not require such a stuffing/casing removal process but which produces a product which appears to be skinless to a typical consumer.

Alginate sausage casings formed by coextrusion to produce sausages having casings which resemble traditional natural sausage casings have been described. For example, US Patent Publication 2009/0317522 discloses the use of sparingly soluble calcium salts to prevent the degradation of alginate coatings during storage. This degradation affects the "snap" or "bite" of the sausage, properties which are associated with natural casings, and which the consumer expects to experience when purchasing these varieties of sausages. Such alginate-encased sausages are not skinless, and are in fact intended to replicate encased sausages.

Moreover, sausage casings comprising alginates may not exhibit desirable adhesion to the food dough, that is, the food material being encased. As described in WO 2014/007630, this lack of adhesion can lead to unwanted deformation and discoloration of the coating due to evaporation of moisture in the coating. Such lack of adhesion can also lead to the formation of air bubbles between the food dough and the casing during cooking, resulting in a visually unappealing product and/or an insufficient cooked product. WO 2014/007630 proposes to overcome this lack of adhesion by adding an acidic buffer to the alginate solution.

Accordingly, therefore, it can be desirable to produce a fine emulsion-type sausage that exhibits desirable adhesion and which also mimics the appearance and feel of a skinless sausage.

SUMMARY OF THE INVENTION

In one aspect, the present invention is directed to a fine emulsion sausage comprising a filling and an alginate casing having a thickness of 0.05 mm or less; said sausage substantially possessing the visible and organoleptic properties of a skinless sausage.

In another aspect the present invention is directed to a method of manufacturing a fine emulsion sausage, which method comprises co-extruding a fine emulsion filling with a casing paste comprising alginate to form a coextruded product comprising 1.5 wt % or less based on the combined weight of the paste and the filling; and contacting such coextruded product with a solution comprising calcium ions, which solution has a pH below the pKa value of the alginate.

In yet another aspect, this invention relates to a fine emulsion sausage produced by the method above.

As a result of the thinness of the coating, as well as its continuity and adhesion, the sausages of this invention, as well as sausages produced by the method of this invention, appear to be skinless to the consumer, even after cooking.

DETAILED DECRYPTION OF THE INVENTION

In one aspect, the present invention is directed to a fine emulsion sausage comprising a filling and an alginate coating having a thickness of 0.05 mm or less; said sausage substantially possessing the visible and organoleptic properties of a skinless sausage. Preferably, the coating has a thickness of 0.04 mm or less, and more preferably, a thickness of 0.03 mm. The casings of the present invention can be prepared with minimal thickness. It can be preferred to make the casings as thin as practical or possible. The thickness of the casing is limited only by the practical capability of the equipment used to make a thin casing that has the desirable properties of the casings described herein. A casing of the present invention that has good qualities should be uniform and should completely cover the sausage. Typically this requires a casing having a minimum thickness of about 0.01 mm.

A sausage product of the present invention substantially possesses the visible and organoleptic properties of a skinless sausage. As used herein, this means that: (i) the coating does not have any noticeable "bite" or "snap" upon consumption such that a typical consumer would be aware that they were consuming a coated rather than a skinless sausage; and/or (ii) the sausage casing is not visibly perceptible to the naked human eye, and do not have the appearance of having a casing.

In addition to "snap" or "bite", the casings described herein are not perceived upon chewing or otherwise consuming the sausage.

The fillings used to produce sausages of the present invention are conventional, and can be produced by conventional processes. A filling suitable for use herein can be produced from a fine meat and/or vegetable emulsion, that is, a fine emulsion sausage. As used herein, the term "fine emulsion" (including the term "fine meat and/or vegetable emulsion") means an emulsion in which the product used is a particulate food product wherein the food particles have an average particle size of 5 mm or less.

As used herein, the term "meat and/or vegetable emulsion" means a mixture comprising (a) finely chopped meat and/or vegetable protein; (b) fat and/or vegetable oil; and (c) water and/or ice. Such mixtures may further comprise those additives conventionally employed in the production of such emulsions including spices, sweeteners, preservatives, and the like, as well as other types of proteins and hydrocolloids such as vegetable proteins (e.g. soya, pea) and starches, guar gum and the like.

When meat emulsions are employed, meats such as beef, pork, veal or various combinations thereof are typically utilized. Other meats such as chicken and/or turkey, for example, may also be used. It is a conventional understanding that "all beef" hot dogs only contain beef. Most hot dogs contain a mixture of pork and beef. When vegetable emulsions are employed, often a mixture of a plant protein (such as soy protein isolate) and vegetable oil are used in place or meat and fat. Mixed meat and vegetable emulsions may be employed to produce low fat sausages.

The fine emulsions employed in the sausages of this invention may be prepared by processes well known to those of ordinary skill in the art. For example, the process can include a two step process wherein: in the first step the meat is mixed with the curing salts and ice and chopped to extract meat protein which is necessary for the formation of a stable emulsion; and in the second step fats, fatty meats, sweeteners, spices and other additives are added with additional water to form the emulsion. These processes also include one-step simultaneous meat and fat cutter treatment. These processes are conventional and are known and understood by one of ordinary skill in the sausage industry. Such processes are described in the Food and Agricultural Organization (FAO) of the United Nations document "Production of Emulsion-Type Sausages" which can be found at http://www.fao.org/docrep/003/x6556e/X6556E07.htm, and is hereby incorporated by reference as if fully set out herein.

As is the term is used herein, a casing of the present invention is an alginate casing. An alginate casing may be alternatively referred to herein as an "alginate coating". A casing of the present invention is a coating or film in which a continuous matrix of alginate and calcium ions is present. A casing of the present invention is formed from an alginate paste after contacting the paste with calcium ions.

The terms "paste", "casing paste", "alginate casing paste" or "alginate paste" as may be used herein all alternatively refer to an alginate containing composition which is suitable for co-extrusion with a fine emulsion food product in the method of the invention. The sausage casings of the present invention are typically prepared from a casing paste comprising at least about 50 wt % alginate, based upon the dry weight of all paste components. In certain embodiments the casing paste comprises at least about 60 wt %, or at least about 75 wt % alginate. Dry weight percentages are the percentages of the individual paste components, on a weight basis, based on of the total weight of all the paste materials prior to the addition of water.

The term "suitable for co-extrusion" as used herein means that the paste has rheological properties suitable for extrusion with the food product. Suitability for co-extrusion can be deduced, for example, from the viscosity of the paste. For the purposes of the present invention, the paste formulations suitable for co-extrusion in the practice of the present invention will typically have a viscosity in the range of 180-400 mPa·s, when measured at 1 wt % at 20° C. using Brookfield type RV (e.g. RVT, RVF, RVTDV) with Brookfield RV spindle 2.

Alginates suitable for use in the practice of this invention will typically have a molecular weight such that they exhibit a viscosity in the range of 300-1,000 mPa·s. when measured at 1 wt % at 20° C. using Brookfield type RV (e.g. RVT, RVF, RVTDV) with Brookfield RV using the appropriate spindle for the viscosity range in question. The appropriate spindle for the viscosity determination can be readily determined by one of ordinary skill in the art, based on the equipment model and the viscosity range. Preferably, such alginates will exhibit a viscosity of between 400 and 800; more preferably between 450 and 650 mPa·s when so measured. Spindle #2 can be used for viscosity measurements in the preferred viscosity range, with the above-specified equipment.

The compositional make-up of the alginate used to prepare the paste is not considered to be critical to this invention, except that such composition may affect the viscosity of the alginate paste. Although the alginates employed may possess any relative content of (1,4)β-D-mannuronate ("M") and (1,4)α-L-guluronate ("G"), in certain embodiments the alginate(s) employed in the practice of the present invention possess an average of at least 50 percent adjacent G units. Preferably such alginate(s) will possess an average of at least 52 percent adjacent G units; and more preferably such alginate(s) will possess an average of at least 55 percent or more of adjacent G units, as such higher the content of adjacent G units results in improved casing properties.

In certain embodiments, the alginate employed in the film-forming composition comprises alginate derived from *Laminaria hyperborea* (stem).

The casing paste optionally can comprise a minor amount of a protein such as dairy protein, animal protein, vegetable protein and mixtures thereof. A minor amount of protein for the purposes of the present invention is less than about 2 wt % of the casing paste. Preferably a minor amount of protein is less than about 1 wt % of the casing paste.

In certain embodiments, the casing paste employed in the present invention comprises a sparingly soluble calcium compound. As is employed herein, the term "sparingly soluble" when applied to calcium compounds means that the calcium compound has a low solubility product, as defined hereinbelow. The solubility product is the product of the equilibrium molar concentrations of the ions in a saturated solution of a compound in water. "Low solubility product" as used in the practice of the present invention is typically not more than $10^{-2}$ at 25 C.°, preferably not more than $10^{-3}$, more preferably not more than $10^{-4}$ at the pH of the casing paste to be co-extruded. The sparingly soluble calcium compound is preferably selected from the group consisting of calcium carbonate, calcium citrate, calcium oxide, calcium phosphates, calcium silicate, calcium sulfate, calcium sulfide, calcium tartrate and various combinations thereof. The sparingly soluble calcium compound is preferably calcium sulfate or di-calcium phosphate or calcium carbonate.

The sparingly soluble calcium compound can be included with the paste in an amount of not less than about 0.1 wt %, preferably not less than about 0.2 wt % of the paste. The sparingly soluble calcium salt is included in an amount of not more than about 10 wt %, and preferably not more than about 4 wt %, more preferably not more than about 1 wt % of the paste.

The alginate paste employed in the practice of this invention may optionally additionally comprise a thickener to adjust casing properties like elasticity. The thickener is typically selected from the group consisting of native starch, modified starch, cellulose gum, cellulose gel, guar gum, tara gum and xanthan gum, carrageenan, gum tragacanth and mixtures thereof. The thickener may optionally be a cold-soluble thickener, for example, a galactomannan. The thickener makes up the remainder of the dry weight of the casing components. As such the thickener can be included in an amount of not more than about 50 wt % of the dry weight of the casing components, but not less than about 5 wt %, preferably not less than about 10 wt %, more preferably not less than about 15 wt %.

The alginate casing paste additionally comprises a sequestrant to help prevent the alginate from gelling before the casing paste is applied. A sequestrant is a chelating agent that has a high affinity for calcium. In order to function as a sequestrant, the sequestrant should have a greater affinity for calcium than the alginate does. Thus the sequestrant will prevent calcium-alginate gelling until the sequestrant has been saturated with calcium ions.

Illustrative of the sequestrants which may be employed are trisodium phosphate, tetrasodium pyrophosphate, sodium hexametaphosphate, sodium tripolyphosphate, sodium citrate, sodium carbonate, ethylene diamine tetraacetate (EDTA), glucono delta-lactone, sodium gluconate, potassium gluconate, and mixtures thereof. Sodium phosphates are preferred sequestrants.

The amount of sequestrant employed will in general depend on a number of factors including the solubility product of the sparingly soluble calcium compound employed as well as the impact of different pH values on the solubility product; the time between the mixing of the sparingly soluble calcium compound into the alginate paste and the application of the casing paste; and the type of sequestrant used. The amount of sequestrant available to interact with calcium ion to prevent premature gelling is a critical factor. If too little sequestrant is used then the sequestrant may become saturated before application. If a large excess of sequestrant is used then it may deplete the sparingly soluble calcium salt leaving no additional calcium ions for the alginate. If the solubility product of the sparingly soluble calcium compound is too high or too low at the pH of the paste, this can affect the gelling time of the alginate. A sequestrant is included in the paste in an amount of not less than about 0.01 wt %, preferably not less than about 0.1 wt %, but not more than about 5 wt % of the paste, preferably not more than about 2 wt %, and more preferably not more than about 0.5 wt % of the paste.

The casing paste can be prepared by mixing one or more alginate containing materials with water, together with any other components such as a thickener. The thickener may optionally be mixed with the alginate containing materials prior to the mixing with water. The thickener can be included in any amount to achieve the viscosity of the paste desired or required for the inventive process.

The casings of the sausages of this invention possess excellent adhesion after cooking coupled with a thinness that results in such sausages being perceived as skinless. Thus, they permit the production of fine emulsion sausages, such as hot dogs, which appear to consumers to be skinless without the need for the use of peelable disposable casings.

In another aspect, the present invention is directed to a method of manufacturing a fine emulsion sausage, which method comprises co-extruding a fine emulsion filling with a casing paste comprising alginate to form a coextruded product comprising 1.5 wt % or less of casing paste, based upon the total weight of the casing paste and the filling; and contacting such coextruded product with a solution containing calcium ions, which solution has a pH below the pKa value of the alginate. Preferably, the coextruded product comprises 1.2 wt. % or less of casing paste, and more preferably about 0.7 wt % of casing paste.

The casing paste is co-extruded with the fine emulsion food material. A typical co-extrusion apparatus might comprise an inner nozzle for the material to be cased and an outer nozzle for the casing paste. The inner nozzle is arranged within the outer nozzle. The nozzles may, for example, be concentric. In that case, the inner nozzle may, for example, be circular and the outer nozzle may, for example, be an annulus. Suitable apparati for the preparation of the co-extruded product are commercially available, and are employed to produce conventional coextruded sausages.

The co-extruded product is contacted with a solution containing calcium ions such that the alginate coating gels to form a sausage casing. The solution comprising calcium ions may, for example, be contained in a bath, through which the co-extruded product passes. The solution comprising calcium ions may alternatively, or additionally, be sprayed onto the co-extruded product. The solution should contain dissolved calcium ions in a concentration sufficient to gel the alginate within the desired time. The solution will typically comprise one or more soluble calcium salts. The solution comprising calcium ions may, for example, be a solution of calcium chloride. The solution preferably comprises a calcium ion concentration equivalent to that produced by a 15 to 30 weight percent solution of calcium chloride, as such a high calcium ion concentration permits faster production speeds.

The calcium solution employed in the practice of this invention comprises a sufficient amount of an acid such that it possesses a pH below the pKa value of the alginate employed. Typically, the pH of the calcium solution is less than about 3, as most alginates tend to have a pKa of from about 3.45 to about 3.65. Any edible acid may be employed, with acetic acid being particularly preferred. Most preferably, acetic acid having a concentration of about 2% (~0.4N) is employed.

Although not wishing to be held to any theory, it is believed that the use of such a highly acid calcium bath permits both the acid gelling of manuronic acid groups as well as the calcium gelling of guluronic acid groups, resulting in a contracting of the alginate casing past to form a thin casing which, when cooked, substantially posseses the organoleptic properties of a skinless sausage.

The coated sausage is then cooked, optionally flavored (e.g., by the addition of liquid smoke) and packaged by means well known to one of skill in the art. However, as will be recognized by such a person, due to the thin coating present the physical forces on the sausage string after coextrusion until the individual sausages have entered the cooking water should be minimized in order for the sausage string not to break during high speed production.

Preferably both the cooking water as well as the cooling water employed contains calcium ions and acid to lower the pH to within the range of from about 3 to about 4, in order to protect the casing and maintain the strength of the casing. Any edible acid may be employed, with acetic acid or lactic acid being particularly preferred. Further, the sausages are preferably dried under low humidity conditions of about 20% relative humidity or less.

It is completely unexpected that a fine emulsion sausage having a thin alginate coating, which sausage exhibits desirable adhesion coupled with organoleptic properties which make it mimic a skinless sausage, could be prepared by co-extruding a filling with a casing paste comprising alginate to form a coextruded product comprising 1.5% or less by weight of casing paste based upon the total weight of the casing paste and filling; and contacting such coextruded product with a solution containing calcium ions, which solution has a pH below the pKa value of the alginate.

In another aspect, the present invention is directed to a sausage produced employing the method described above.

EXAMPLES

The following examples are provided to illustrate the invention in accordance with the principles of this invention, but are not to be construed as limiting the invention in any way except as indicated in the appended claims.

Example 1

Hot dogs were prepared employing a meat dough having the following ingredients:

| | | | |
|---|---|---|---|
| MDM | 69.00% | 51.75 | kg |
| Water/ice | 21.50% | 16.125 | kg |

-continued

| | | | |
|---|---|---|---|
| Tapioca starch | 2.80% | 2.1 | kg |
| Soya Isolate | 3.00% | 2.25 | kg |
| Phosphates | 0.30% | 0.225 | kg |
| Nitrite salt | 1.80% | 1.35 | kg |
| Seasoning (Vienna) (Pureline from Raps) | 0.60% | 0.45 | kg |
| Carrageenan (Gelcarin XP 3484) | 0.50% | 0.375 | kg |
| guar gum (3500) | 0.50% | 0.375 | kg |
| | 100.00% | 75 | kg |

Trial Procedure:
  Casings: Paste with 7% PROTANAL ME 5147 (a commercial blend of alginate, starch and phosphate) was made by mixing 1.34 kg PROTANAL ME 5147 with 17.8 kg water/ice. The pKa of PROTONAL ME 5147 is about 3.5.
  Calcium bath: 30% CaCl2, 2% of 80% acetic acid (Brix: 45) This bath has calculated pH of about 2.6, although a pH meter may give a lower number due to the high calcium ion concentration.
  Standard conpro:
  Caliber 19, 110 mm using 5-blade cutter (formed ends). Trials done at full speed, which for 110 mm sausages is 400 portions/minute~0.83 m/s
  0.7% paste on the sausages (~0.03 mm casing layer)
  Cooking in water bath at 75 Deg. C. containing 1% CaCl2 plus 0.07% of 80% acetic acid
  After cooking in water, treatment with cold diluted liquid smoke (dipping just 1-2 seconds) followed by drying at 85 Deg. C for 5 minutes (preheated chamber)
  Cooling in water containing 1% CaCl2 until the core temperature is 45-50 Deg. C followed by air cooling/drying
  Vacuum packaging (no pasteurization)

The sausages appeared in the pack to be skinless sausages with no visual indication of a casing. When taken out of the package it was not possible to peel the casing. After reheating in water the casing was still firm around the sausages, and could not be peeled off or visually identified. Another indication of a suitable thin casing was that when the sausages were lightly squeezed simultaneously from both ends no casing wrinkling could be seen.

Comparative Experiment A

Fine emulsion Vienna-type sausages were produced in accordance with the present in accordance with the process disclosed in Example 1 of Patent Application WO 2014/007630, which discloses that the use of an acidic buffer solution will enhance the binding of an alginate casing to proteins contained within the sausage stuffing.

1. Stuffing Emulsion Recipe:
  Beef II: 18.0%
  Pork III: 30.0%
  Fat: 24.0%
  Jowls: 5.0%
  Ice: 19.3%
  Nitrite salt: 1.7%
  Phosphate: 0.15%
  Ascorbic acid: 0.05%
  Spices: 0.8%
2. Process to make the stuffing emulsion:
  Procedure in bowl chopper: Beef II, Pork III, nitrite salt, phosphate and ⅔ of ice were added to the chopper and chopped at 4000 rpm at 8° C.

3. Casing Paste Formulation:
  Alginate: 5.0%
  Citric acid: 3.8%
  Na citrate: 1.9%
  Water: 89.2%
4. Process to make the Casing Paste: Citric acid and Na citrate were dissolved. The alginate was added into the buffer solution and the mixture was chopped at full speed of knives (~4500 rpm) and bowl for 5 minutes under vacuum.
5. Co-extrusion process:
  The meat preparation was coextruded with the paste, while spraying with the brine using a ConProLink system: Caliber 23, 100 gram (25 cm long).
6. Brine composition: 30% CaCl₂ and 2% of acetic acid (80% concentration).
7. Cooking/smoking program:
  Drying: 20-30 minutes at 50-60° C. Relative Humidity RH<10% in the chamber at the end of the drying time
  Smoking: 10-15 minutes at 60° C.
  Cooking: 10-15 minutes at 78° C. with water steam
  Cooling: interval showering for ~10 minutes.

After cooling the sausages were vacuum packed and evaluated during the shelf life (>3 months) by heating the sausages in water at ~90 C. 5 minutes Adhesion Evaluation:
  After reheating the sausages in water at ~90° C. during 5 minutes, the sausages were immediately cut in 1 cm pieces and casing was peeled off. The % of meat adhesion to the casing was calculated by surface of meat that stays in the casing.
  Not possible to measure due to the flaking of the casing.

Visual Integrity of the Casing:
  After reheating visual evaluation were made to evaluate if the casings fragment and detach in flakes.
  It was observed that the casings fragment and detach in flakes leaving a poor surface appearance of the sausage.

The above results indicate that adding an acid to the casing paste itself will not result in the production of fine emulsion sausages with a coating that exhibits desirable adhesion. Consequently, it is unexpected that adding an acid to the calcium bath such that it has a pH below the pKa value of the alginate will result in a casing having desirable appearance and adhesion such that it mimics a skinless sausage.

What is claimed is:
1. A fine emulsion sausage comprising a filling and an alginate casing having a thickness of less than 0.05 mm;
  said sausage substantially possessing the visible and organoleptic properties of a skinless sausage;
  wherein the alginate casing is uniform, continuous and not visibly perceptible, and wherein the fine emulsion sausage is a cooked sausage,
  wherein the alginate casing is free of a sparingly soluble calcium compound.
2. The sausage of claim 1 wherein the alginate casing has a thickness of 0.04 mm or less.
3. The sausage of claim 1 wherein the alginate casing has a thickness of 0.03 mm or less.
4. The sausage of claim 1 wherein the filling comprises at least one of: beef, pork, veal, chicken and turkey.
5. The sausage of claim 1 wherein the filling comprises a plant protein.
6. A method of manufacturing a fine emulsion sausage, which method comprises co-extruding a fine emulsion filling with a casing paste comprising alginate to form a coextruded product comprising 1.5 wt % or less of casing paste based on the combined weight of the casing paste and filling; and contacting such coextruded product with a solution comprising calcium ions, which solution has a pH below the pKa value of the alginate and a calcium ion concentration equivalent to that produced by at least 15 weight percent solution of calcium chloride.

7. The method of claim 6 wherein the coextruded product comprises 1.2% or less by weight of casing paste, based upon the total weight of the casing paste and filling.

8. The method of claim 7 wherein the coextruded product comprises about 0.7% by weight of casing paste based upon the total weight of the casing paste and filling.

9. The method of claim 6 wherein the solution comprising calcium ions has a calcium ion concentration equivalent to that produced by a 15 to 30 weight percent solution of calcium chloride.

10. The method of claim 6 wherein the solution comprising calcium ions comprises acetic acid.

11. The method of claim 6 wherein the solution comprising calcium ions has a pH of 3 or less.

12. The method of claim 6 wherein the casing paste further comprises a sparingly soluble calcium compound.

13. The method of claim 6 wherein the casing paste further comprises a sequestrant.

14. The method of claim 6 further comprising the step of cooking the sausage in water comprising calcium ions at a pH in the range of from about 3 to 4.

15. The method of claim 14 further comprising the step of cooling the sausage in water comprising calcium ions at a pH in the range of from about 3 to 4 after cooking the sausage.

16. The method of claim 6 wherein the casing paste has a viscosity in the range of 180-400 mPa's, when measured at 1 wt % at 20° C. using Brookfield type RV with Brookfield RV spindle 2.

17. A fine emulsion sausage produced according to the method of claim 6.

18. The sausage of claim 1 wherein the alginate casing comprises: at least about 50 wt % alginate; a thickener; and a sequestrant.

19. The method of claim 13 wherein the sequestrant has a greater affinity for calcium than the alginate does.

20. The sausage of claim 1 wherein the alginate casing comprises alginate having an average of at least 50 percent adjacent G units.

21. The method of claim 6 wherein the alginate has an average of at least 50 percent adjacent G units.

22. The method of claim 6 wherein the casing paste is free of a sparingly soluble calcium compound.

23. The sausage of claim 1 wherein the alginate casing possesses such adhesion that it cannot be peeled off from the sausage.

* * * * *